United States Patent [19]
Brozoski et al.
[11] 4,137,490
[45] Jan. 30, 1979

[54] TRIGGER SPEED CONTROL SWITCH

[75] Inventors: Daniel J. Brozoski, Franksville; Pupak T. Pupak, Menomonee Falls, both of Wis.

[73] Assignee: Cutler-Hammer, Inc., Milwaukee, Wis.

[21] Appl. No.: 849,676

[22] Filed: Nov. 8, 1977

[51] Int. Cl.[2] .................................................. H02P 5/16

[52] U.S. Cl. .................................. 318/345 G; 361/386; 200/157; 338/198

[58] Field of Search ......................... 361/380, 386, 387; 318/249, 305, 345 G; 200/157, 153 L, 153 LA; 310/50, 68 A; 338/198

[56] References Cited

U.S. PATENT DOCUMENTS

| | | | |
|---|---|---|---|
| 3,775,576 | 11/1973 | Brown | 200/157 |
| 3,936,708 | 2/1976 | Dummer | 318/249 |

*Primary Examiner*—Gerald P. Tolin

*Attorney, Agent, or Firm*—Hugh R. Rather; William A. Autio; Michael E. Taken

[57] ABSTRACT

A speed control subassembly is made by providing a generally flat heat sink plate having a laterally-formed collector strip at its upper edge. A double-sided-adhesive insulator tape strip is stuck to the heat sink, this tape having a hole large enough to receive a thyristor chip so that the thyristor anode contacts the heat sink with solder paste therebetween. Two formed terminal strips extending in opposite directions are stuck to the tape so that one contacts the cathode and the other contacts the gate of the thyristor chip with solder paste therebetween. A chip capacitor is placed across the terminal strips with solder paste therebetween. A small force is applied to the capacitor and then heat is applied to the stack of parts to solder the parts together and to the heat sink and to set the adhesive resin. This subassembly is then placed into a trigger switch housing and connected to the contacts and variable resistor thereof to provide a trigger speed control switch for portable tools.

8 Claims, 7 Drawing Figures

TRIGGER SPEED CONTROL SWITCH

BACKGROUND OF THE INVENTION

Trigger speed control switches have been known heretofore. For example, M. R. Dummer U.S. Pat. No. 3,936,708, dated Feb. 3, 1976, and assigned to the assignee of this invention, discloses a speed control subassembly wherein the mounting tab of a plastic pack semiconductor is soldered to a connector serving as a collector for the variable resistor, and the cathode and gate terminals of this semiconductor are connected across a capacitor and to the variable resistor, and this subassembly is connected to the contacts of a trigger switch to form a complete speed control trigger switch for portable tools. While such construction has been useful for its intended purposes, this invention relates to improvements thereover.

SUMMARY OF THE INVENTION

An object of the invention is to provide an improved trigger speed control switch.

A more specific object of the invention is to provide an improved speed control subassembly for a trigger speed control switch.

Another specific object of the invention is to provide a trigger speed control switch that is simple in construction and economical to manufacture.

Other objects and advantages of the invention will hereinafter appear.

DESCRIPTION OF THE PREFERRED EMBODIMENT

Referring to FIGS. 1-7, there is shown a self-enclosed trigger speed control switch constructed in accordance with the invention. As shown therein, the switch comprises a spring-biased trigger 2 mounted for linear sliding movement in a switch housing. This housing comprises a frame 4 and a pair of base halves designated as left base L and right base R, respectively, most clearly shown in FIGS. 1-3. This frame 4 clamps the two halves of the base together upon insertion thereof up from the bottom and also clamps slidable rear portion 2*a* of the trigger on top of the base so that finger engaging portion 2*b* extends forwardly under the force of trigger return spring 6 for depression by the forefinger of the user.

Figure 3:
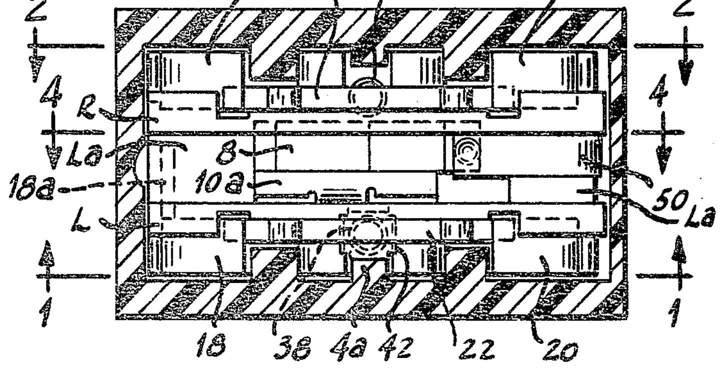
FIG. 3 is a horizontal cross-sectional view taken substantially along line 3—3 of FIG. 1 to show the contacts and variable resistor strip in top view.
Figure 4:
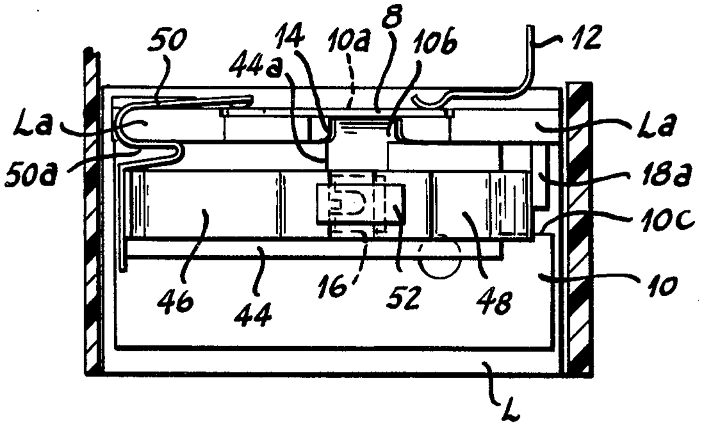
FIG. 4 is a vertical cross sectional view taken substantially along line 4—4 of FIG. 3 to show the speed control subassembly mounted to the left base half within the center compartment.

To form a center compartment for the speed control subassembly, the left base half is provided with an upper ledge La shown in FIGS. 3 and 4, and the right base half is provided with a lower ledge (not shown), each abutting the other base half when the two base halves are clamped together by the frame, as shown in more detail in H. W. Brown U.S. Pat. No. 3,775,576, dated Nov. 27, 1973, and assigned to the assignee of this invention. Ledge La extends toward the right against base half R at a location a short distance below the top of the base to provide a defined space above this ledge for resistor strip 8 and collector strip 10*a* arranged side by side for simultaneous engagement by sliding contact or brush 12 as shown in FIGS. 3 and 4.

This ledge La and base half R are provided with means holding them in registration with one another to prevent them from moving in any direction in a vertical plane as seen in FIG. 4 while the surrounding frame holds them from spreading apart. This means comprises suitable projections and notches as more specifically described in the aforementioned Brown patent.

Figure 5:
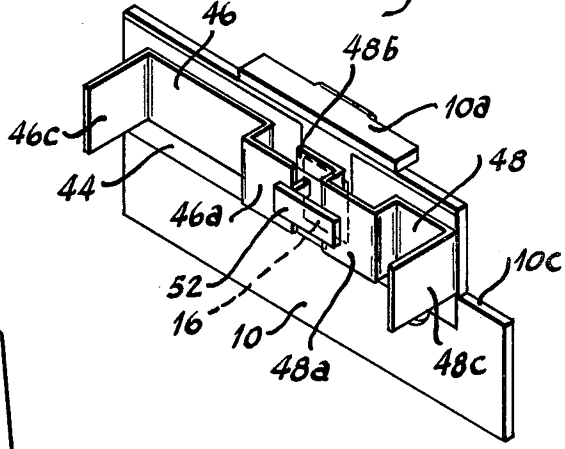
FIG. 5 is an isometric view of the speed control subassembly of the switch also shown in FIG. 4 in elevation.

Collector (or connector) 10*a* is the upper integral portion of a flat vertical heat sink 10 that is suspended from ledge La by its T-shaped upper portion marked 10*a* in FIGS. 3-5. This flat vertical heat sink 10 supports the speed control elements hereinafter described. This flat, substantially rectangular heat sink 10 is pressed flat against the wall of left base half L within the center compartment and is suspended from ledge La by integrally formed T-shaped collector 10*a*. For this purpose, the stem 10*b*, shown in FIG. 4, of this T-shaped portion extends up through lateral slot 14 that divides ledge La into two parts, and the crossbar 10*a* of this T-shaped portion is bent 90 degrees toward the right side of the switch as shown in FIGS. 3-5 to lie flat in a shallow groove in the upper surface of this ledge as shown in FIG. 4 to provide a "collector" type electrical connector along which movable contact brush 12 of the variable resistor runs when the trigger is moved.

Figure 7:
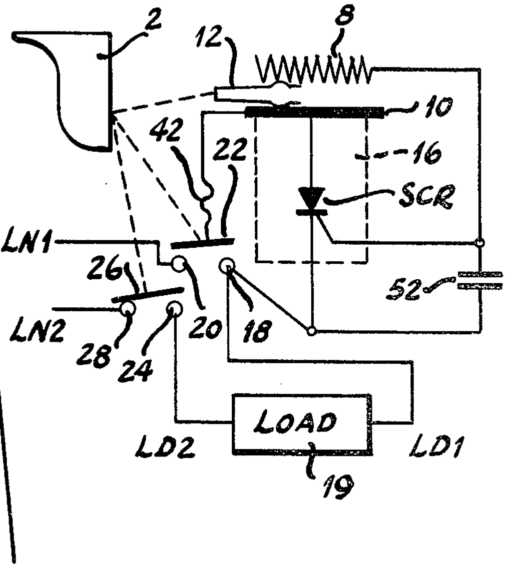
FIG. 7 is a schematic circuit diagram of the speed control trigger switch of FIGS. 1-6 and of its connection to a load.

To insure good electrical contact at all times, movable contact 12 is provided with four resilient fingers having downwardly-bowed portions at their contact end as shown in FIG. 4, two of which slide on reisstor strip 8 to vary the resistance in the circuit and the other two of which slide on connector 10*a* to maintain the resistor slider connected to the heat sink as shown schematically in the circuit diagram of FIG. 7. The mounting end of this movable contact 12 is bent upwardly and is frictionally held in a slot in the trigger, as shown in FIG. 1, for movement with the trigger.

Heat sink 10 is made of electrically conducting metal of good heat conducting type such as tin-plated copper and forms the anode terminal for the silicon controlled rectifier (SCR) chip 16 enclosed in broken lines in FIG. 7. This heat sink is provided with a notch 10*c* at its forward upper corner as shown in FIGS. 4 and 5 to provide electrical clearance for lateral tab 18*a* of the shunting switch stationary contact 18 shown in FIGS. 1, 3, and 4.

This trigger speed control switch is provided with a double-pole switch that closes both sides of the line on initial depression of the trigger thereby to connect load 19 in series with the speed control circuit across AC power lines LN1 and LN2, and is provided with a shunting switch or contact that closes near the end of the trigger depression stroke to shunt the speed control circuit and thus connect the load directly across the AC lines. Variable speed control takes place during the intermediate portion of trigger depression that occurs after the double-pole on-off switch closes and before the shunting switch closes.

Figure 1:
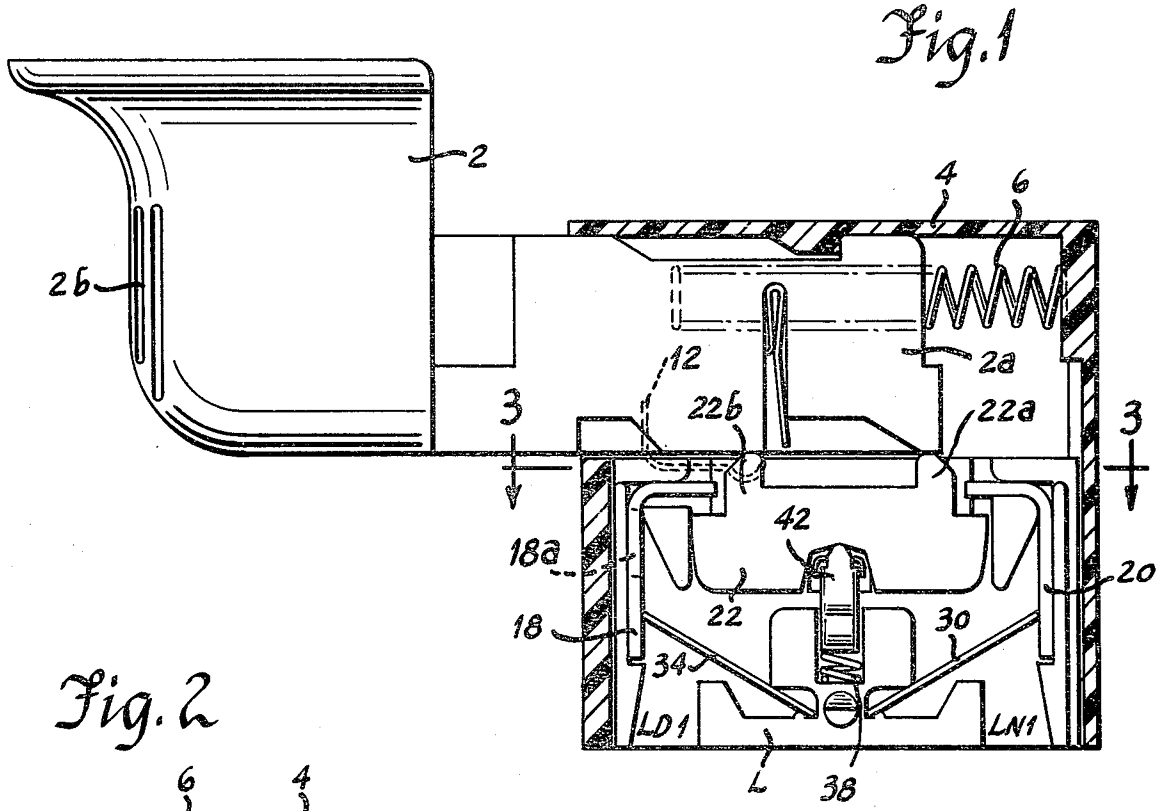
FIG. 1 is an enlarged left elevational view of the trigger speed control switch with the left side wall of the frame broken away substantially along line 1—1 of FIG. 3 to show the left pole of the two-pole switch, the shunting contact and connectors in the left compartment.

One pole of the double-pole switch includes rear stationary contact 20 and the rear half of movable butt contact 22 shown in FIG. 1, this pole being the left pole of the switch and being mounted in the left side compartment of the switch housing as shown in FIG. 3. The other pole of the double-pole switch includes forward stationary contact 24 and movable butt contact 26 shown in FIG. 2, this pole being the right pole of the switch and being mounted in the right side compartment of the housing as shown in FIG. 3. Movable contact 26 always engages a rear connector 28 whereby it is connected to power line LN2 as shown in FIG. 7.

Power line LN1 is connected to contact 20 in FIG. 1 by pressing the stripped and soldered end of the stranded conductor up through the slot in the base half L and between contact 20 and leaf spring retainer 30. In a similar manner, power line LN2 is connected by pushing it between connector 28 and leaf spring retainer 32 in FIG. 2.

The load is connected by pushing one of its wire leads between contact 18 and leaf spring retainer 34 in FIG. 1. And the other load lead is pushed between contact 24 and leaf spring retainer 36 in FIG. 2 to provide the connections shown schematically in FIG. 7.

Figure 2:
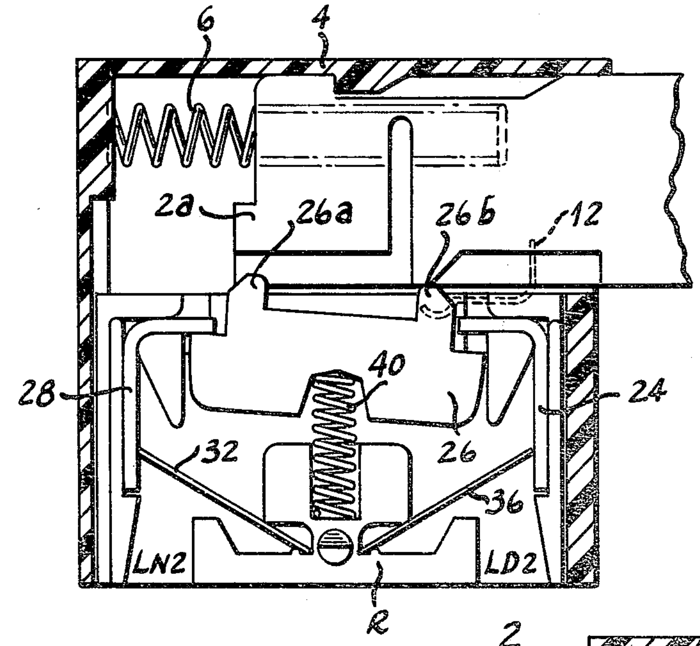
FIG. 2 is a right side elevational view of the housing and part of the trigger of the switch of FIG. 1 with the right side wall of the frame broken away substantially along line 2—2 of FIG. 3 to show the second pole of the 2-pole switch and connectors in the right compartment.

As shown in FIGS. 1 and 2, helical compression springs 38 and 40 bias movable butt contacts 22 and 26, respectively, toward closed positions with their respective stationary contacts and the trigger is provided with cam surfaces for operating these movable butt contacts. Butt contact 22 is a flat piece of electrically conductive metal such as copper and is provided with a center notch in its lower edge into which spring-biased connector cap 42 is seated. One arm of cap 42 contacts heat sink 10 through an aperture in the left base half L as more clearly shown in the aforementioned H. W. Brown or M. R. Dummer patents while its other arm bears against a vertical rib 4*a* on the inner wall of the frame as shown in FIG. 3. A shoulder at the rear end of contact 22 underlies stationary contact 20 and upon closure connects one power line LN1 to the speed control circuit, the connection going through connector cap 42 to the heat sink. A shoulder at the forward end of contact 22 underlies stationary contact 18 and forms the shunting switch for bypassing the speed control circuit for full speed operation of the load device which may be a portable electric drill.

Movable butt contact 26 is like butt contact 22 except that it has only one circuit closing contact at its forward end and its rear end forms a connector always in engagement with connector 28 as shown in FIG. 2. Butt contact 26 is provided with a like notch at its lower center for seating spring 40. A shoulder at its forward end underlies stationary contact 24 and a similar shoulder at its rear end constantly engages the underside of connector 28.

As shown in FIG. 1, movable butt contact 22 is provided with a pair of upwardly projecting cam followers including a rear cam follower 22*a* and a forward cam follower 22*b*. These two cam followers are pressed upwardly against the trigger cams for operation by the trigger as described in the aforementioned H. W. Brown patent.

Movable butt contact 26 is similar and is provided with rear and forward cam followers 26*a* and 26*b*, shown in FIG. 2, although only forward cam follower 26*b* is operated by the trigger cam as more fully described in the aforementioned H. W. Brown patent.

Figure 6:
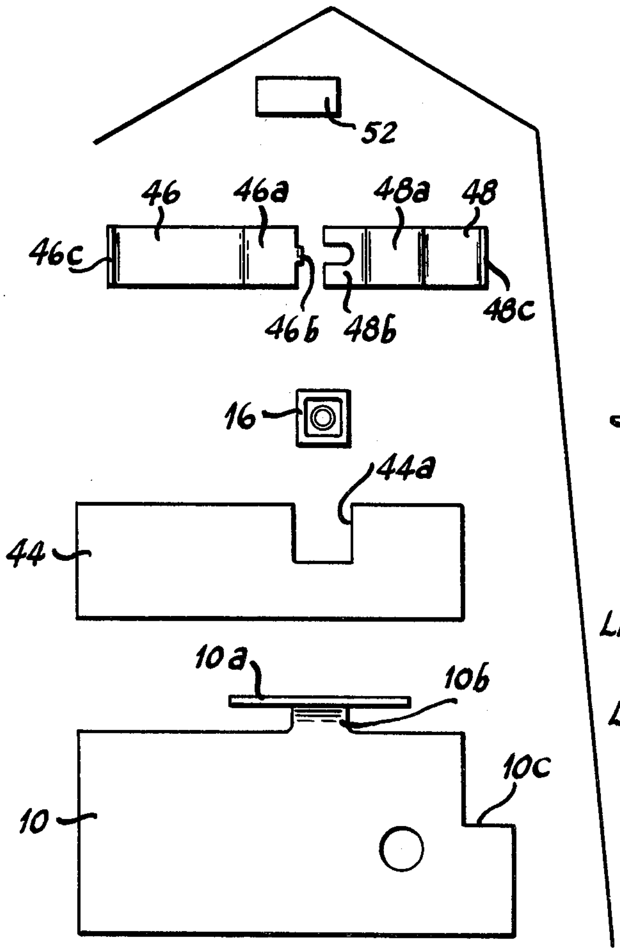
FIG. 6 is an exploded view of the parts of the subassembly of FIG. 5.

As shown in FIGS. 4–6, this switch is provided with an improved speed control subassembly that is put together by a unique method. A piece of tape 44 is provided with adhesive on both sides and a hole or notch 44*a* large enough to receive thyristor chip 16 such as an SCR is cut at one side of this tape. One surface of this double-sided adhesive tape is then stuck onto the surface of heat sink 10. The thyristor chip is then placed within this hole 44*a* with its anode side against the heat sink and with solder paste therebetween preparatory to securing the SCR chip to the heat sink as hereinafter described. A pair of terminals 46 and 48 are formed so as to contact the gate and cathode, respectively, of the thyristor. For this purpose, these terminals are made by cutting predetermined lengths of metal ribbon such as tin plated copper and forming them. Terminal 46 is provided with an offset portion 46*a* having a narrow strip 46*b* at one end bent back to contact the gate at the center of the thyristor when the main portion of this terminal is stuck to the tape as shown in FIG. 5. The other end 46*c* is bent out at an angle to afford connection thereto a connector 50 that contacts the rear end of resistor strip 8 as shown in FIG. 4. Connector 50 may be soldered to terminal 46 and provided with a suitable reentrant bend 50*a* so that it applies inherent pressure contact to the resistor strip.

Terminal 48 is provided with a similar offset portion 48*a* with one end bent back and to the left in FIG. 6 and provided with a bifurcated tip 48*b* to contact the cathode of the thyristor that surrounds the gate on the chip, as shown in FIGS. 5 and 6, when the main part of this terminal is stuck to the tape. While a thyristor having a cathode surrounding its gate is shown, other than center gate types such as edge-connected gate types can be used. Solder paste is placed between contacts 46*b* and 48*b* of these terminals and the gate and cathode of the thyristor. The other end 48*c* of this terminal is bent out at an angle to allow connection thereof to tab 18*a* later on as shown in FIG. 4.

Then, solder paste is placed on the offset portions 46*a* and 48*a* of these terminals and monolythic chip capacitor 52 is placed thereacross.

Thereafter, a small force is applied to capacitor 52 to hold the parts together and heat is applied to this subassembly to secure the parts together. The anode of the thyristor becomes soldered to the heat sink, the terminals 46 and 48 become soldered to the gate and cathode of the thyristor, and the capacitor becomes soldered across these terminals. Also, this heat which may be about 400 degrees F. (204° C.) and applied by a solder plate or the like sets the adhesive tape resin to fix the tape and the terminals securely to the heat sink.

This tape may be a 3M Co. polyester film having a rubber resin thermosetting adhesive on both sides, or the like. This polyester film is a thin, physically durable and high dielectric tape having excellent chemical, solvent and moisture resistance. The thermosetting adhesive appearing on both sides of the tape, when subject to the required thermosetting cycle, will cross-link to provide greater adhesion, bonding, higher solvent resistance and generally better heat resistance.

As a result of the aforementioned method of making, there is provided a speed control subassembly wherein the thyristor, the two terminals and the capacitor are rigidly secured to the heat sink and electrically connected to one another and to the heat sink and electrically insulated in the proper manner. This subassembly may then be easily mounted in the trigger switch housing and electrically connected to the resistor strip and contacts to provide the circuit shown in FIG. 7.

The circuit in FIG. 7 is operated by depressing trigger 2. On initial depression of the trigger, double-pole on-off contacts 20–22 and 24–26 close to connect the SCR in series with the load across the AC power lines LN1 and LN2. Further depression of the trigger causes brush 12 to slide along resistor 8 to reduce the value of resistance in the circuit. As a result, the current flow to capacitor 52 increases to charge this capacitor to the firing value of the SCR earlier on each positive half-cycle of the AC supply voltage, that is, on each half-cycle that positive voltage is applied to the anode of the SCR. This causes the SCR to fire into conduction earlier on each positive half-cycle of the supply voltage and to conduct for the remainder of each such positive half-cycle thereby to increase the motor speed, assuming that the load is a motor of a portable tool such as a drill. The motor speed can be controlled by variation of the trigger depression. At or near the end of the trigger depression, shunting contacts 18–22 close to by-pass the SCR and connect the load directly across the power lines for full speed operation.

While the apparatus hereinbefore described is effectively adapted to fulfill the objects stated, it is to be understood that the invention is not intended to be confined to the particular preferred embodiment of trigger speed control switch and method of making disclosed, inasmuch as it is susceptible of the various modifications without departing from the scope of the appended claims.

We claim:

1. A trigger speed control comprising:
- an insulating housing having switch contacts and a variable resistor mounted therein;
- a spring-biased trigger mounted for movement in said housing and normally extending therefrom for depression by the user to close said switch contacts and to operate said variable resistor;
- and a speed control circuit subassembly in said housing comprising:
- a heat sink and means connecting it to said variable resistor;
- a thyristor having its anode side soldered to said heat sink;
- a double-sided adhesive insulating film stuck to said heat sink adjacent to said thyristor;
- a pair of terminals stuck to said film and having end portions contacting the gate and cathode of said thyristor;
- a chip capacitor soldered across said terminals;
- said adhesive on said film being thermoset to securely bond said terminals to said heat sink;
- and said terminals being connected to said variable resistor and said contacts to provide a trigger speed control circuit capable of variable motor speed control by trigger depression.

2. The trigger speed control switch claimed in claim 1, wherein:
- said heat sink comprises a vertical plate to which said double-sided adhesive film is stuck and a lateral collector strip;
- and said variable resistor comprises a resistor strip mounted in said housing and connected to one of said terminals and a contact brush slidable by said trigger for contacting both said resistor strip and said collector strip.

3. The trigger speed control switch claimed in claim 2, wherein:
- said double-sided adhesive film is a polyester film having adhesive resin on both sides.

4. The trigger speed control switch claimed in claim 2, wherein:
- said switch contacts comprise double-pole contacts for controlling both sides of a power line to the motor;
- and said housing comprises three compartments with the two poles of said double-pole contacts being mounted in the left and right compartments, respectively, and said speed control circuit subassembly being mounted in the center compartment.

5. The trigger speed control switch claimed in claim 1, wherein:
- said thyristor is a silicon controlled rectifier.

6. The trigger speed control switch claimed in claim 1, wherein:
- each of said terminals is a ribbon-like strip having a main portion stuck to said adhesive film and having an offset portion at one end and an outwardly-bent connector portion at the other end;
- the offset portion of one of said terminals being bent back and narrowed to contact the gate at the center of said thyristor;
- and the offset portion of the other of said terminals being bent back and bifurcated to contact the cathode surrounding said gate of said thyristor.

7. The trigger speed control switch claimed in claim 6, wherein:
- said terminal strips extend in opposite directions from said thyristor so that their outwardly bent connector portions are substantially spaced apart to facilitate connection thereof to said variable resistor and said contacts.

8. The trigger speed control switch claimed in claim 1, wherein:
- said end portions of said pair of terminals that contact the gate and cathode of said thyristor are soldered thereto to provide reliable electrical connections.

* * * * *